Sept. 13, 1966  R. M. VOITIK  3,272,519
PIVOT SEAL CONSTRUCTION
Filed Dec. 12, 1962
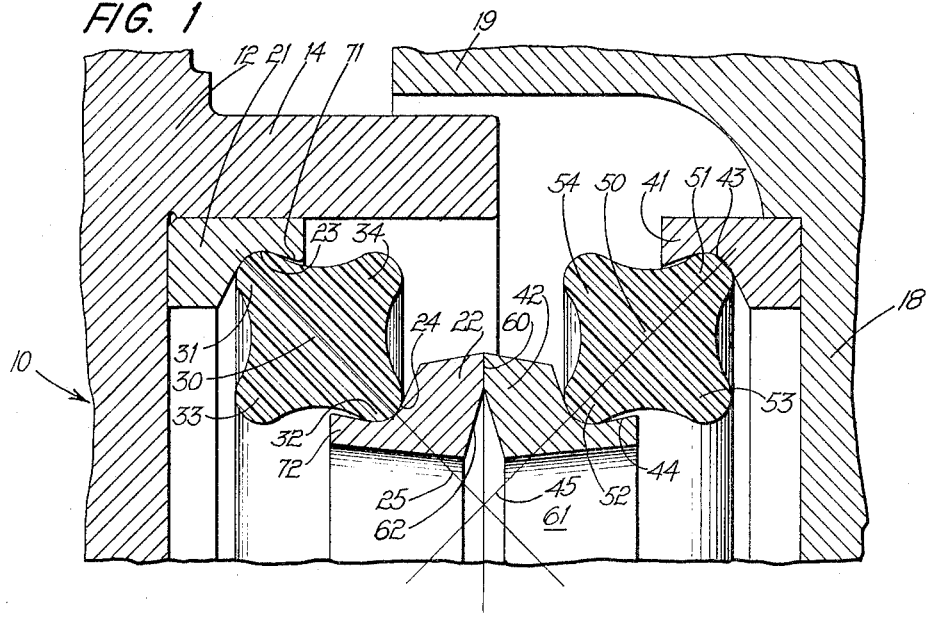
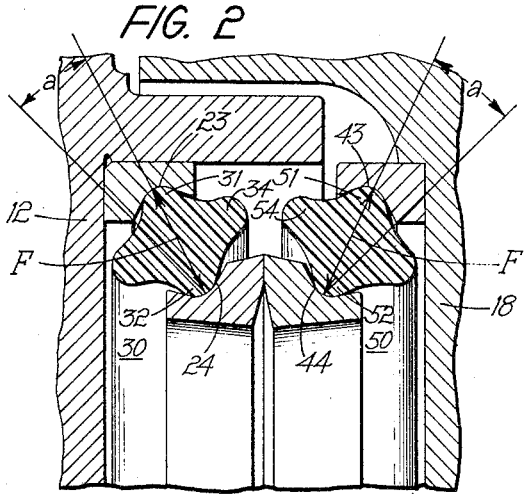
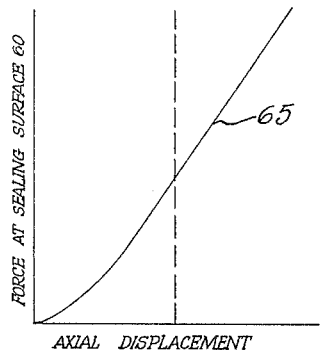
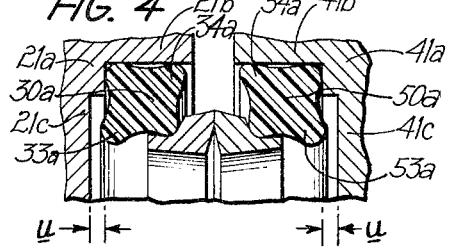
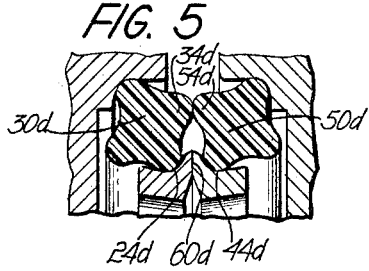
INVENTOR
ROBERT M. VOITIK
BY
Wolfe, Hubbard, Voit & Osann
ATTORNEYS

United States Patent Office 3,272,519
Patented Sept. 13, 1966

3,272,519
PIVOT SEAL CONSTRUCTION
Robert M. Voitik, Evanston, Ill., assignor to Continental Illinois National Bank and Trust Company of Chicago (trustee)
Filed Dec. 12, 1962, Ser. No. 244,032
9 Claims. (Cl. 277—92)

The present invention relates to improvements in shaft seals and, more particularly, to a resilient seal for sealing a large diameter rotary joint.

It is an object of the invention to provide a seal construction which is capable of maintaining a reliable seal between two relatively rotating members for long periods of time and under adverse conditions as, for example, between the rear wheel of a tractor and the tractor frame for exclusion of mud and grit from the working parts.

It is another object to provide a seal which has a high degree of resilient followup in the axial direction and which can therefore tolerate considerable relative movement or runout between the members being sealed. In other words, it is an object to provide a seal which has a large range or "throw" over which the seal is fully effective. It is a related object to provide a seal which, notwithstanding the range of axial movement over which it is desired to operate, is capable of exerting large unit forces and which is, therefore, well suited for heavy duty usage. It is another object related to the foregoing to provide a seal which is capable of resiliently absorbing, and storing, large amounts of energy of deformation even though the sealing element itself is of relatively small cross section.

It is a more detailed object to provide a seal in which the force does not rise steeply to a peak value, as with conventional seals, when subject to a large displacement but in which the force rises more or less linearly with strain, free of any tendency toward instability and without danger of unseating.

It is still another object to provide a sealing element which is self-aligning in its seats and which requires a minimum of retaining structure to hold the element in position. In this connection, it is an object to provide a sealing element which is easy to install, which is detented into its working position and which, once installed, requires little or no maintenance. It is another object in this connection to provide a sealing element which need not be replaced when worn but which may be simply reversed or "rolled" 90° to provide a new set of wear surfaces substantially doubling its wear-life.

It is yet another object to provide a sealing assembly which insures that relative rotation will take place at the rotor surfaces.

Other objects and advantages of the invention will become apparent upon reading the attached detailed description and upon reference to the drawings, in which:

FIGURE 1 is a section of a portion of a machine embodying the present invention with the sealing elements in the relaxed state;

FIG. 2 is a sectional view similar to FIG. 1 but showing the sealing elements under working conditions;

FIG. 3 is a graphical illustration of the loading characteristics of a seal of the present invention;

FIG. 4 is a sectional representation showing an alternative form of the invention; and FIG. 5 is a further modified form thereof.

While the invention is susceptible of various modifications and alternative constructions, certain illustrative embodiments have been shown in the drawing and will be described below. It should be understood, however, that there is no intention to limit the invention to the specific forms disclosed, but, on the contrary, the intention is to cover all modifications, alternative constructions, and equivalents falling within the spirit and scope of the invention as expressed in the appended calims.

Referring now, more particularly, to the drawings wherein an exemplary arrangement of relatively rotatable elements is illustrated, employing seals embodying the present invention in one of its forms, the seals of the present invention are adapted to provide an effective barrier to the passage of lubricating fluids from their intended environment on one hand, and the penetration of foreign matter, such as dirt and grit, into areas where such matter might be expected to cause irreparable damage to moving parts.

In illustrating the invention, a portion of a machine, generally indicated at 10, is shown, and is representative of a portion of an axle shaft and associated bearing and seal assembly for a heavy duty, off-the-road tractor in which a large diameter seal is called upon to operate under most severe conditions. It will, however, be appreciated that many and varied applications consistent with the invention will occur to those skilled in the art. The structure shown includes a portion of a journal housing 12 provided with a laterally extending wall portion 14 which defines an annular space about a shaft (not shown) which is journaled in any suitable manner in the housing 12. The axle shaft carries a hub 18 at one end thereof, which, in turn, may carry a wheel, or drive an endless track, or perform some other rotary function. The hub 18 is also formed with a laterally extending wall portion 19 which extends inwardly towards, and telescopes over, the wall 14, with intentional clearance provided between the two.

In order to protect easily damaged parts from damage and wear by foreign matter entering through the clearance space, a novel sealing arrangement is provided between the machine housing 12 and hub 18. In accomplishing a seal having the advantages set forth hereinabove, adjacent sealing rings are provided, mounted in any suitable fashion, such as on the shaft, not shown. The rings are constructed so as to provide a bearing seal between them while permitting relative rotation thereof.

In accordance with the present invention, two rigid annular sealing members are provided having concave grooves spaced from one another axially and radially and so oriented as to be facing one another along a conical locus with a resilient sealing ring between them of "rounded square" cross section and with the annular members being held "advanced" toward one another so that under operating conditions the cross section is deformed into diamond shape. More specifically, in accordance with the invention, two pairs of annular members are provided, one pair fixed, the other pair rotated, and having grooves mounting sealing rings of the rounded square type arranged in intersecting cones, with the inner ones of the annular members being surfaced to provide a rotary bearing surface between them. Thus, referring to the drawing, there is provided a first annular member 21, which is recessed within the cylindrical wall 14, and a second annular member 22, which is of small cross section relative to its diameter. The annular member 21 contains an annular concave groove 23 which is preferably of smoothly curved cross section, and the annular element 22 has formed on its outer surface a similar groove 24. The two grooves 23, 24 are so oriented as to face one another along a conical locus indicated by the line 25. Interposed between the two concave grooves is a resilient sealing element 30 of "rounded square" cross section having symmetrically arranged corners 31, 32, 33, 34, which are rounded as shown and which are separated by scalloped sides so that the corners form well-defined contact lobes, the diagonal corners 31, 32 being seated in the grooves 23, 24, respectively. Similarly, there is seated within the wall 19, an annular member 41 having a companion member 42 in which are formed concave grooves 43, 44, respectively, facing one another along a conical locus indicated by the line 45. Interposed between these members is a resilient sealing ring 50 having lobes 51, 52, 53, 54.

To provide for relative rotation between the housing or frame members 12, 18, both of the annular members 22, 42 are machined so as to provide a bearing surface or mutual interface 60. The members 22, 42 are preferably formed of an alloy having a high degree of toughness and resistance to wear, even in the presence of the abrasive effect of grit, dirt, or the like. The sealing members, taken together, form a central chamber 61 containing the bearings and other parts to be protected, the space being plentifully supplied with lubricant. To facilitate entry of lubricant to the bearing face 60, the annular members 22, 42 are preferably chamfered, as indicated at 62.

In FIG. 1, toward which the above discussion has been primarily directed, the resilient rings 30 and 50 have been shown in their normal "square" or unstressed state. However, in carrying out the invention, the members are not operated in this state, but, on the contrary, the frame and hub members 12, 18 are held "advanced" toward one another axially in order to deform them from the normal "square" to "diamond" shape and to increase the unit force at all engaged surfaces. Thus the members, under running conditions, are caused to occupy the positions shown in FIG. 2, where it will be noted that the corners 31, 32 of one of the rings and the corners 51, 62 of the other ring are stressed in compression to perform the active sealing function. The present invention is not limited to any specific environmental construction and, thus, any desired thrust bearing means (not shown) may be employed to hold the hub 18 in a running position advanced toward the frame 12. Since, in the preferred embodiment, the grooves 23, 24 and 43, 44 are smoothly concave and generally conform to the rounded corners of the sealing rings they engage, each sealing ring is free to rock or pivot through an angle $a$ at each of the engaged surfaces as the members 12, 18 are brought from the condition shown in FIG. 1 toward one another to the running condition shown in FIG. 2. Such pivoting allows each ring to assume an equilibrium position in which a symmetrical force F is applied from corner to corner (FIG. 2) and in which localized twisting forces at the corners are minimized. Thus, the present construction is to be distinguished from prior constructions in which a resilient sealing ring is "fitted" into a square corner and where register with the corner must be maintained in spite of bodily deformation of the cross section of the sealing element. In the preferred form of the invention, the curvature of the grooves is made somewhat less than the curvature of the corners of the resilient sealing ring. This permits bodily rocking of the sealing ring cross section about the region of contact without interference between the sidewall of the grooves and the adjacent side of the sealing ring, even when the sealing rings are rocked into working position through a substantial angle.

Using the present construction, it is found that high unit forces may be developed at the sealing surfaces and that considerable axial movement may occur between the sealed members without destroying the effectiveness of the seal. A primary reason for the development of high unit forces is that the working line of force F developed in each of the resilient sealing rings is oriented at a sharp angle with respect to the axis. Such angle may, for example, be on the order of 60° or more. Consequently, axial movement of the member 12 relative to the member 18 results in a wedging or crowding action, with high mechanical advantage, against the diagonal corners of the sealing ring. Stated in other words, the present sealing arrangement has a large range or "throw" over which the seal is fully effective. Moreover, the present seal is capable of exerting a large force in the horizontal direction (the horizontal component of the force F) so that high unit pressures may be developed at the surface 60, where relative rotation occurs. The latter is particularly important in a large diameter seal, thus, the large axial forces tend to insure that all over contact is at all times maintained at the bearing surface 60 in spite of any tendency toward warpage of either of the two rings. Moreover, since the rings 22, 42 are "floating" with respect to the remainder of the structure, the two resilient sealing rings 30, 50 may axially work back and forth through a small distance during a typical revolution. The net result is that a reliable seal is maintained at all five of the engaged surfaces at all times, even when the seal is of extremely large diameter.

Because of the crowding action mentioned above, the unit force at the resilient sealing surfaces will be, in the normal case, substantially greater than that at the rigid rotor interface 60. This insures that any rotation will take place at the rotor surface, as intended.

In the above paragraphs, mention has been made of high unit forces and the tolerance of axial movement. It is, however, one of the further features of the present construction that the increase in axial stress as a function of axial movement occurs more or less linearly rather than suffering any rapid buildup to a peak value, which characterizes conventional compression-type seals. Thus, referring to FIG. 3, it is found that as the hub member 18 is moved inwardly toward the frame member 12, the force exerted at the bearing surface 60 between members 22, 42 rises along a substantially straight line 65. This provides further indication of the difference in spacing between the outer elements which may be tolerated in the present seal construction. Then too, it is a feature of the present construction that there is no possibility of buckling or "roll-over" of the resilient elements, which might cause them to be unseated from their respective grooves upon exceeding a predetermined stress, i.e., upon bringing the members 12, 18 too close together. Thus, as a limiting condition, the adjacent corners 34, 54 simply come into contact so that each of the resilient rings is braced against the other to avoid any overcenter forces which might cause the sealing rings to pop out of the grooves provided for them.

It is a still further feature of the present invention that the concave grooves 23, 24 and 43, 44 are slightly undercut, i.e., formed with an overhanging lip so that the sealing rings tend to snap or detent into position, thereby facilitating assembly of the seal. Thus, taking the left-hand sealing member 30, in FIG. 1, by way of example, the groove 23 has an overhanging lip 71, while the cooperating groove 24 has an overhanging lip 72. Stated in other terms, the grooves 23, 24, while symmetrically opposed in working position, have an angular "offset" during installation which produces a well-defined detenting. Moreover, the sealing ring 30 may be made slightly "undersize" in diameter. The net result is that the inner annular member 22 is self-supported by the resilient ring 30. In similar fashion, with the companion sealing ring 50 snapped into place, the inner annular member 42, which acts as a rotor, is firmly supported during assembly and up until the complete sealing assembly comes together at the bearing surface 60. Thus, while all of the sealing members are hidden from view in the assembled unit, there is assurance that each element occupies its proper position, and no auxiliary supporting means is required.

It is one of the novel features of the present construction that the sealing surfaces may be renewed without necessity for replacing the resilient sealing rings. Thus, after the rings have been in service sufficiently long to run the risk that the seal may no longer be perfect, the surfaces can be easily and quickly renewed simply by reversing each of the sealing rings, thereby bringing the inactive corners 33, 34 of ring 30 and corners 53, 54 of ring 50 into active position. This substantially doubles the useful life of the resilient elements.

One criterion of the effectiveness of a seal of the compression-type is the amount of energy which the sealing element is capable of absorbing and releasing as it is strained in one direction or the other, the energy in the present instance being defined as the integral of the axial stress over the distance of axial movement. It is found that in the present construction the energy-storage capacity per unit of volume of the resilient ring material substantially exceeds that which is available in other designs when stressed by identical loads. This is due to the fact that the axial force has a mechanical advantage over the internal compression force, and this mechanical advantage increases with the degree of compression.

The above comments have been directed toward the general construction and operation of the improved seal. In a practical case, specifically a sealing assembly intended for use in an off-the-road tractor, the sealing element may have a diameter of 17 inches, an unstressed radial thickness of ⅝ inch, and an unstressed width of ⅝ inch. It may be formed of synthetic rubber, such as having a durometer rating of 40, providing, under working conditions, a total axial force of 350 pounds distributed over the bearing surface 60. Also, under working conditions, the unit stress at the resilient sealing surfaces may lie within the range of 25 to 200 pounds. It will be apparent that these forces are sufficient to insure sealing contact and thereby reliably guard against loss of lubricant or, conversely, entry of foreign materials, such as dirt or water, into the enclosed and sealed space 61.

While the invention has been described in connection with the preferred embodiment, it will be understood that the invention is not limited thereto but is, on the contrary, subject to a number of interesting modifications. Thus, the invention is not limited to constructions in which only the diagonal corners of the resilient sealing element are engaged, but includes, in addition, arrangements in which the diagonally opposite corners are supported and perform a useful sealing function. Thus, referring to FIG. 4, the outer annular member 21a, which corresponds in position to the number 21 in FIG. 1, and which is shown diagrammatically, is extended axially, as indicated at 21b. The concave groove 23 has been eliminated and a substantially square corner provided. Such an arrangement has been found effective in maintaining seal position. Thus, the portion 21b of the member engages and laterally braces the corner 34a of the resilient ring 30a. In the case of the companion ring 50a, it is supported in an annular member or receptacle 41a having an axially extending portion 41b. Thus, additional sealing area is provided. The members 21a and 41a are undercut or counterbored an amount "u" at 21c and 41c, thereby permitting the lobes 33a and 53a to remain free. In this manner, full use of the tendency of the seals to cant inwardly when mounted is employed to position and hold the seals in the manner indicated.

As a still further modification of the present invention, the axial thickness of the inner annular rings 22, 42 may be made such that when the sealing elements are in operating condition, contact occurs between the adjacent corners 34, 54 of the two rings. Such an arrangement is set forth in FIG. 5, in which corresponding parts are indicated by corresponding reference numerals with the addition of adscript "d." Referring to this figure, the construction is substantially the same as that shown in FIG. 1, with the exception that the two inner grooves 24d, 44d are more closely spaced so that when the resilient sealing rings are stressed, under operating conditions, the adjacent corners 34d, 54d are in contact with one another. Such contact serves to keep foreign materials away from the bearing surface indicated at 60d. This version has particular utility where rotation is limited to a slow speed, particularly in a liquid environment, to reduce any tendency toward wear at the engaged resilient surfaces.

It is found that heat transferred to the sealing elements is more easily dissipated because of the increased area resulting from the lobe and scalloped design, which permits the resilient element to function at lower temperatures.

While the seal construction is particularly advantageous for seals of large diameter, for example, on the order of 12 to 24 inches, it will be apparent to one skilled in the art that the seal may be constructed in lesser diameters while still making use of some of the advantages inherent in the construction.

In the following claims, which refer to deformation of the sealing ring from "rounded square" to "diamond-shaped" cross section, it will be understood that the term "diamond-shaped" is intended simply to refer to a deformation such that the cross-sectional dimension of the ring is, as a result of stress, greater along one corner-to-corner diagonal than it is along the other.

In those claims reciting a pair of resilient sealing rings engaging inner and outer grooved elements, it will be understood that the "inner" and "outer" refer to the axial and not necessarily radial relation of the elements.

I claim as my invention:

1. In a large diameter fluid seal, the combination comprising first and second pairs of inner and outer annular members adjoining one another, each of the members of a given pair axially and radially spaced from one another and having grooves formed therein, said grooves being so oriented as to be facing one another along a conical locus, first and second resilient sealing rings interposed between the respective pairs of annular members, each said sealing ring being of generally square cross section with rounded corners and scalloped sides to define lobes, each said sealing ring having diagonally opposite lobes, disposed on the conical locus of and in sealing engagement with the respective pair of annular members, the adjacent inner ones of the annular members being in bearing contact with one another for relative rotation, said grooves being of smoothly concave section thereby to permit bodily rocking movement of the engaged lobes of each sealing ring with respect to the grooves as the inner and outer annular members are moved axially toward one another into running position, and means for holding the outer ones of the annular members advanced inwardly toward one another so that the sealing rings are deformed into generally diamond-shaped cross section for the development of high sealing and bearing forces over the regions of engagement.

2. In a large diameter fluid seal, the combination comprising an outer annular member having a concave groove formed therein, an inner annular member having a concave groove formed therein, said annular members being axially and radially spaced from one another with said grooves so oriented as to be facing one another along a conical locus, a resilient sealing ring seated in said grooves, said sealing ring being of generally square cross section having rounded corners and scalloped sides forming symmetrical lobes in the normal unstressed state, said sealing ring having diagonally opposite lobes disposed on the conical locus and in sealing contact with the surfaces of the respective grooves, said grooves being of smoothly concave section thereby to permit bodily rocking movement of the engaged lobes of each sealing ring with respect to the grooves as the inner and outer annular members are moved axially toward one another into running position, and means for holding the two annular members advanced toward one another so that the cross section of the ring is deformed into generally diamond shape.

3. In a large diameter fluid seal, the combination comprising an outer annular member having a groove formed therein, an inner annular member having a groove formed therein, the annular members being axially and radially spaced from one another with said grooves so oriented as to be facing one another along a concal locus, a resilient sealing ring seated in said grooves, said sealing ring being of generally square cross section, having rounded corners and scalloped sides to form symmetrical lobes, said sealing ring having diagonally opposite lobes disposed on the conical locus and seated in said grooves, said grooves being of smoothly concave section thereby to permit bodily rocking movement of the engaged lobes of the sealing ring with respect to the grooves as the inner and outer annular elements are moved axially toward one another into running position.

4. In a large diameter fluid seal, the combination comprising an outer annular member having a groove formed therein, an inner annular member having a groove formed therein, said annular members being axially and radially spaced from one another with said grooves so oriented as to be facing one another along a conical locus, a resilient sealing ring seated in said grooves, said sealing ring being of generally square cross section having rounded corners and scalloped sides forming symmetrical lobes, said sealing ring having diagonally opposite lobes disposed on the conical locus and in sealing contact with the surfaces of the respective grooves, at least one of said grooves having walls which are sufficiently extensive as to supportingly engage at least one of the remaining lobes.

5. In a large diameter fluid seal, the combination comprising an outer annular member having a groove formed therein, an inner annular member having a groove formed therein, said annular members being axially and radially spaced from one another and said grooves so oriented as to be facing one another along a conical locus, a resilient sealing ring seated in said groove, said sealing ring being of generally square cross section, having rounded corners and scalloped sides forming four lobes which are symmetrical in the normal unstressed state, two diagonally opposite ones of said four lobes being disposed on the conical locus and in active sealing engagement with said grooves for compression of the sealing ring into diamond shape, at least one of said grooves having extensive walls in supporting contact with the other two of said four lobes.

6. In a large diameter fluid seal, the combination comprising first and second pairs of annular members adjacent one another, each of the members of a given pair axially and radially spaced from one another and having grooves formed therein, said grooves being so oriented as to be facing one another along a conical locus, first and second resilient sealing rings interposed between the respective pairs of annular members, each of said sealing rings being of generally square cross section with rounded corners and scalloped sides to define lobes, each of said sealing rings having diagonally opposite lobes disposed on the conical locus of the grooves formed in the associated pair of annular members with said diagonally opposite lobes in sealing engagement with the respective annular members, the adjacent inner ones of the annular members being in bearing contact with one another for relative rotation, said grooves being of smoothly concave section providing an annular lip for detented engagement of the sealing ring when the latter is in its unstressed state, thereby to insure that the members and ring remain in engagement following assembly, and means for holding the outer ones of the annular members advanced inwardly toward one another so that the sealing rings are deformed into generally diamond-shaped cross section for the development of high sealing and bearing forces over the regions of engagement.

7. In a fluid seal, the combination comprising an outer annular member, an inner annular member, said annular members being axially and radially spaced from one another, and a resilient sealing ring disposed between said inner and outer members, said sealing ring being of generally square cross section having rounded corners and scalloped sides forming symmetrical lobes in the normal unstressed state, seating for said sealing ring formed on said inner annular member and said outer annular member and disposed on a conical locus, said sealing ring having two diagonally opposite ones of said lobes disposed on said conical locus and in sealing contact with said seating means, said seating means being of smoothly concave section in the region of sealing contact with said diagonally opposite ones of said lobes thereby to permit bodily rocking movement of the engaged lobes of the sealing ring with respect to the sealing means as the inner and outer annular members are moved axially toward one another into running position, and means for holding the two annular members advanced towards one another so that the cross section of the ring is deformed into generally diamond shape.

8. In a large diameter fluid seal, the combination comprising an outer annular member, an inner annular member axially and radially spaced from said outer annular member and having a generally concave groove formed thereon, a resilient sealing ring disposed between said annular members and being of generally square cross section, having rounded corners and scalloped sides to form symmetrical lobes, said sealing ring having a diagonally opposite pair of said lobes disposed on a conical locus and seated against said annular members, one of said lobes being seated in said groove and the other against said outer annular member, said groove being of smoothly concave section, thereby to permit pivoting movement of the sealing ring with respect to the annular members as they are moved axially toward one another into running position.

9. In a fluid seal, the combination comprising first and second pairs of annular members adjacent one another, each of the members of a given pair being axially and radially spaced from one another and having seating means formed therein so oriented as to be facing one another along a conical locus, first and second resilient sealing rings interposed between the respective pairs of annular members, each of said sealing rings being of generally square cross section with rounded corners and scalloped sides to define lobes, each of said sealing rings having a pair of diagonally opposite lobes disposed on its associated conical locus and in sealing engagement with the respective annular members in the seating means provided thereon, the adjacent inner ones of the annular members being in bearing contact with one another for relative rotation, at least one of said seating means being of smoothly concave section for permitting a pivoting action of said sealing rings, and means for holding the outer ones of said annular members advanced inwardly toward one another so that the sealing rings are deformed into generally diamond-shaped cross section for the development of high sealing and bearing forces over the regions of engagement.

References Cited by the Examiner
UNITED STATES PATENTS

| 3,072,414 | 1/1963 | Porges | 277—81 |
| 3,167,321 | 1/1965 | Land et al. | 277—92 |

FOREIGN PATENTS

| 239,463 | 9/1960 | Australia. |

LAVERNE D. GEIGER, *Primary Examiner.*

SAMUEL ROTHBERG, *Examiner.*

E. DOWNS, J. MEDNICK, *Assistant Examiners.*